(12) United States Patent
Shaimi

(10) Patent No.: US 8,236,179 B2
(45) Date of Patent: Aug. 7, 2012

(54) METHOD AND INSTALLATION FOR REGULATING THE MODIFIER LEVEL IN CHROMATOGRAPHY OR SUPERCRITICAL EXTRACTION WITH RECYCLING

(75) Inventor: Mohamed Shaimi, Montfavet (FR)

(73) Assignee: PIC Solution, Avignon (FR)

( * ) Notice: Subject to any disclaimer, the term of this patent is extended or adjusted under 35 U.S.C. 154(b) by 0 days.

(21) Appl. No.: 13/294,565

(22) Filed: Nov. 11, 2011

(65) Prior Publication Data

US 2012/0055876 A1 Mar. 8, 2012

Related U.S. Application Data

(62) Division of application No. 12/063,559, filed as application No. PCT/FR2006/001946 on Aug. 11, 2006, now Pat. No. 8,114,282.

(30) Foreign Application Priority Data

Aug. 12, 2005 (FR) ...................... 05 08535

(51) Int. Cl.
  *B01D 15/08* (2006.01)
(52) U.S. Cl. ..................... 210/659; 210/198.2
(58) Field of Classification Search .................. 210/635, 210/656, 659, 101, 137, 143, 198.2; 96/102; 95/82
See application file for complete search history.

(56) References Cited

U.S. PATENT DOCUMENTS

| | | |
|---|---|---|
| 4,478,720 A | 10/1984 | Perrut |
| 4,696,745 A | 9/1987 | Itagaki et al. |
| 4,724,087 A | 2/1988 | Perrut |
| 4,871,453 A | 10/1989 | Kumar |
| 5,133,859 A | 7/1992 | Frank et al. |
| 5,180,487 A | 1/1993 | Saito et al. |
| 5,340,476 A | 8/1994 | Berger et al. |
| 5,458,783 A | 10/1995 | Levy et al. |
| 5,755,559 A | 5/1998 | Allington et al. |
| 5,954,954 A | 9/1999 | Houck et al. |
| 6,685,828 B2 | 2/2004 | Berger et al. |
| 6,766,810 B1 | 7/2004 | Van Cleemput |
| 7,678,276 B2 | 3/2010 | Matabe |
| 2003/0034307 A1 | 2/2003 | Berger et al. |
| 2004/0014590 A1 | 1/2004 | Horhota et al. |
| 2006/0108285 A1 | 5/2006 | Bounoshita et al. |
| 2009/0050567 A1 | 2/2009 | Aumann et al. |

FOREIGN PATENT DOCUMENTS

| | | |
|---|---|---|
| EP | 0 254 610 A1 | 1/1988 |
| EP | 0 567 165 A1 | 10/1993 |

OTHER PUBLICATIONS

Gonzales et al, "Measurement of Diffusion Coeffcients for 2-Nitroanisole, 1,2-Dichlorobenzene and Tert-Butylbenzene in Carbon Dioxide Containing Modifiers," Journal of Supercritical Fluids 24: 219-229 (2002).
International Search Report and Written Opinion From Corresponding Application No. PCT/FR2006/001946 Dated Feb. 12, 2008.

*Primary Examiner* — Ernest G Therkorn
(74) *Attorney, Agent, or Firm* — Seyfarth Shaw LLP

(57) ABSTRACT

A chromatography or supercritical extraction method is disclosed, in which the eluent comprises a mixture of a fluid and a modifier and in which the fluid is recycled. One exemplary method comprises an operation consisting in determining at least one quantity linked to the level of modifier that is mixed with the recycled fluid and, if necessary, a correction operation in order to limit variations in the level of modifier in the eluent at the inlet of the column or the extractor. The disclosure also relates to a chromatography or extraction installation.

10 Claims, 2 Drawing Sheets

METHOD AND INSTALLATION FOR REGULATING THE MODIFIER LEVEL IN CHROMATOGRAPHY OR SUPERCRITICAL EXTRACTION WITH RECYCLING

CROSS REFERENCE TO RELATED APPLICATIONS

This patent application is a Divisional Application of U.S. patent application Ser. No. 12/063,559, filed on Apr. 16, 2009, now U.S. Pat. No. 8,114,282 which is a 371 filing of International Patent Application No. PCT/FR2006/001946, filed on Aug. 11, 2006, which claims priority to French Application No. 0508535, filed on Aug. 12, 2005, the contents of all of which are incorporated herein by reference in their entirety.

FIELD OF THE INVENTION

In general, this present invention concerns the methods that make use of a fluid in a supercritical state and, in particular, the field of chromatography and extraction in the supercritical phase.

SUMMARY OF THE INVENTION

More precisely, according to a first of its aspects, the invention concerns a chromatography or extraction method that includes:
- a separating operation in a column or extractor, with the said column or the said extractor receiving a product and being fed into an eluent that includes a supercritical fluid, routed via a first pumping operation, and a modifier, routed via at least one second pumping operation,
- an operation to collect at least one fraction downstream of the column or extractor,
- an operation for recycling the supercritical fluid mixed with a residual quantity of modifier following after the collecting operation and preceding the first pumping operation, with the said first pumping operation being used to pumps at least the said supercritical fluid mixed with a residual quantity of modifier, and
- a condensing operation, following on from the collecting operation and preceding the first pumping operation.

Such a chromatography or extraction method, in which the supercritical fluid is recycled, is known to those skilled in the art.

Recycling of the supercritical fluid is preferable in order to reduce the cost of implementing the method and the necessary actions, particularly when high flows are employed.

For example, at a flow of carbon dioxide ($CO_2$), used as a supercritical fluid, of 80 ml/min, about 115 kg of $CO_2$ is lost every 24 hours if it is not recycled. This loss represents a considerable cost.

In a conventional chromatography or extraction method in the supercritical phase, the addition of a modifier is often necessary in order to increase the polarity of the supercritical fluid.

In chromatography and extraction, the modifier level at the input to the chromatography column or the extractor is an important parameter that affects the performance of the method.

When the supercritical fluid is not recycled, this modifier level is easily kept constant in that it depends on the flow in the pump supplying the modifier, as well as on the flow in the pump supplying the supercritical fluid, with these two flows themselves being kept constant.

On the other hand, when the supercritical fluid is recycled following the collecting operation, a certain quantity of modifier can also be so. The result is a variation of the modifier level at the input to the column or extractor, which is harmful to the method.

In chromatography, for example, a variation of the modifier level at the input to the column affects the retention time, the resolution, and sometimes the selectivity of the eluted products and therefore the stability of the method.

This also applies to the extraction, in which the modifier level affects the extraction time and the concentration of extracted product.

One is familiar with French patent FR 2 601 883, which concerns a method and a device for separation with the aid of a supercritical fluid, in which the supercritical fluid is recycled.

After the separating operation and before it is recycled, the supercritical fluid, in the gaseous or semi-gaseous phase and containing a residual quantity of modifier, is brought into contact with the modifier in the liquid phase in a conventional gas/liquid contactor.

The composition of the phase with the lowest density (gaseous or semi-gaseous) is adjusted by varying the pressure and the temperature so as to obtain the desired supercritical-fluid/modifier mixture at the output from contactor.

This method is limited however, due to the thermodynamic balances to be observed in the contactor, at mixtures containing at most 10% by weight of modifier.

Moreover, this method is complex to implement. In fact it leads to a requirement for a certain number of elements in, and in relation to the contactor, such as a system for filling and monitoring the level of modifier, a coating, a sintered material and a droplet-separating device.

In this context, the aim of this present invention is to propose a chromatography or extraction method in which the supercritical fluid is recycled, and free of the limitations of the prior art.

To this end, the method of the invention, which also conforms to the generic definition provided in the foregoing preamble, is essentially characterised in that it also includes:
- downstream of the collecting operation and upstream of the separating operation, an operation for determining at least one magnitude associated with the level of modifier mixed with the recycled supercritical fluid, and if necessary
- an operation for correcting the flow in the first pumping operation and the flow in the second pumping operation, in order to limit variation, during execution of the method, of the modifier level in the eluent at the input to the column or extractor, and in a direction that is suitable for meeting a first setpoint, determined beforehand, of total flow corresponding to the sum of the flows of the first pumping operation and the second pumping operation.

The invention therefore has the advantage of proposing controlling of the modifier level at the input to the column or extractor. As a consequence, the method of the invention is more stable than the methods of the prior art that use a modifier and recycle the supercritical fluid without regulation of the modifier level. By the stability of the method is meant the maintenance of all of its parameters (temperatures, pressures, flows, levels, etc.) at constant values. In particular, the method of the invention ensures minimal variation of the modifier level at the input to the column or extractor.

In addition, in the method of the invention, there exists no limitation of the modifier level in the eluent. The user can choose to make up an eluent containing between 0 and 100% of modifier.

In general, an eluent constitutes the mobile phase of a chromatography or extraction. According to the invention, the mobile phase is based on a fluid chosen from any fluid that is compatible with an application in chromatography or extraction in the supercritical phase. Hereinafter, such a fluid will be referred to as a supercritical fluid, even if, in certain pressure and temperature conditions, the fluid is not in a supercritical state in the strict sense of the term. The supercritical state corresponds to a pressure value (P) that is greater than the critical pressure (Pc), and to a temperature value (T) that is greater than the critical temperature (Tc). Also in the supercritical state is included the subcritical state for which P>Pc and T<Tc. We speak of a supercritical or subcritical fluid with reference to a fluid of which the density and therefore the solvent power undergo wide variation with the pressure and the temperature when it is pure.

By simplification, we refer to the supercritical or subcritical state as the state that the fluid would assume is it were in the quoted pressure and temperature conditions only, even if, in these conditions, it is mixed with another solvent and the state of the mixture is not necessarily supercritical or subcritical.

We finally speak of a recycled supercritical fluid even if the fluid in the temperature and pressure conditions is not in a supercritical state in the strict sense of the term, but in a state that can be gaseous (with the temperature being greater than the liquid-vapour equilibrium temperature for the pure fluid at a working pressure less than the critical pressure) or liquid (with the temperature being less than liquid-vapour equilibrium temperature for the pure fluid at a working pressure less than the critical pressure).

The eluent can also include a liquid solvent or a mixture of liquid solvents, which constitutes a modifier. The modifier can be an organic solvent. This is added in order to modify the polarity of the supercritical fluid.

By a magnitude associated with the modifier level is meant any magnitude from which the value of the modifier level can be obtained, directly or indirectly. Thus, this magnitude can be the modifier level itself.

In a first preferred embodiment of the invention, the operation for determining at least one magnitude associated with the level of modifier mixed with the recycled supercritical fluid takes place upstream of the first and second pumping operations and includes:
  an operation for measuring, at one measuring point at least, the density of the recycled supercritical fluid mixed with a residual quantity of modifier, and
  an operation for evaluating the level of modifier mixed with the recycled supercritical fluid, with the modifier level being evaluated, from the measured density, by means of a calibration-density=f (modifier level) graph established beforehand at the pressure and the temperature existing at the measuring point and around the latter, and
  the correction operation consists of modifying the flow in the first pumping operation and the flow in the second pumping operation in order to meet the first setpoint and a second setpoint, set beforehand, for the modifier level in the eluent.

In this first embodiment, the first pumping operation and the second pumping operation preferably take place in parallel with each other. The second pumping operation can also take place upstream of the first pumping operation.

According to a second preferred embodiment of the invention, the operation for determining a magnitude associated with the modifier level in the eluent consists of measuring the density of the eluent upstream of the first pumping operation and downstream of the second pumping operation, and the correction operation consists of modifying the flow in the first pumping operation and the flow in the second pumping operation in a direction that is suitable for meeting the first setpoint and a third setpoint, set beforehand, for the density of the eluent.

Preferably, the operation for determining at least one magnitude associated with the level of modifier mixed with the recycled supercritical fluid is effected downstream or upstream of the condensing operation.

Advantageously, the method of the invention can also include at least one operation for regulating the pressure followed by at least one operation for regulating the temperature, downstream of the separating operation and upstream of the collecting operation.

The invention also concerns a chromatography or extraction installation that includes:
  a separating device such as one or more chromatography columns or an extractor, which receives a product and feeds into an eluent that includes a supercritical fluid, routed via a first pump, and a modifier, routed via at least one second pump,
  a device for collecting at least one fraction of the product separated in the separating device,
  a path for recycling the supercritical fluid mixed with a residual quantity of modifier, downstream of the collection device and upstream of the first pump, with the said first pump pumping at least the said supercritical fluid mixed with a residual quantity of modifier, and
  a condenser placed downstream of the collection device and upstream of the first pump,
with the said installation being characterised in that it also includes a measuring and correcting device, placed in the recycling path or downstream of the first pump, and upstream of the separating device, which measures at least one magnitude associated with the level of modifier mixed with the recycled supercritical fluid and that, if necessary, performs correction of the flow in the first pump and of the flow in the second pump in order to limit the variations, while running the installation, of the said levels at the input to the separating device, and in a direction that is suitable for meeting a first setpoint, determined beforehand, of total flow corresponding to the sum of the flows in the first pump and in the second pump.

According to a first preferred embodiment of the invention, the measuring and correcting device is positioned at a measuring point located upstream of the first and second pumps and measures the density of the recycled supercritical fluid, mixed with a residual quantity of modifier, from which it evaluates the level of modifier mixed with the recycled supercritical fluid by means of a pre-established density=f (modifier level) calibration curve at the pressure and the temperature existing at the measuring point and around the latter; and the said measuring and correcting device modifies the flow in the first pump and the flow in the second pump in order to attain the first setpoint and a second setpoint, set beforehand, of modifier level in the eluent.

In this first embodiment, the first pump and the second pump are preferably mounted in parallel with each other. The second pump can also be positioned upstream of the first pump.

According to a second preferred embodiment of the invention, the measuring and correcting device measures the density of the eluent upstream of the first pump and downstream of the second pump, and the correction consists of modifying the flow in the first pump and the flow in the second pump in a direction that is suitable for meeting the first setpoint and a third setpoint, set beforehand, for the density of the eluent. The measuring and correcting device can be located downstream or upstream of the condenser.

According to one particular embodiment, the installation according to the invention also includes a device to regulate the pressure, a pressure-reducer for example, followed by a device to regulate the temperature of the eluent, by heating it for example, downstream of the separating device and upstream of the collection device.

The invention is advantageously implemented with carbon dioxide as the supercritical fluid.

As the modifier, it is preferable to use an organic solvent liquid, like an alcohol for example.

BRIEF DESCRIPTION OF THE DRAWINGS

Other characteristics and advantages of the invention will emerge more clearly from the detailed description provided below, purely as a guide and in no way limiting, with reference to the appended drawings in which.

DETAILED DESCRIPTION OF THE PREFERRED EMBODIMENTS

Figure 1:
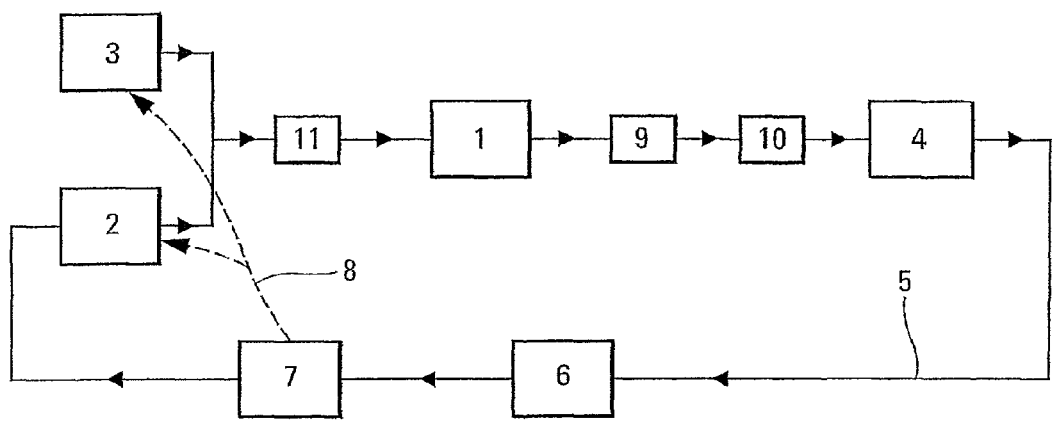
FIG. 1 is a diagram of one embodiment of the method of the invention.

According to one particular embodiment of the invention, the chromatography or extraction method includes the operations represented in FIG. 1.

Conventionally, a separating operation 1 takes place in a chromatography column or in an extractor.

The column or the extractor are supplied with an eluent that includes a supercritical fluid and a modifier.

The product P is inserted into the chromatography column, by injection for example.

A first pumping operation 2 brings the supercritical fluid, which has been subjected beforehand to a condensing operation 6, to the column or to the extractor.

A second pumping operation 3 brings the modifier to the column or to the extractor.

Thus, a supercritical-fluid/modifier mixture constituting the eluent is formed for the separating operation 1. At this stage, the eluent is preferably in a supercritical state.

An operation 11 for regulating the temperature of the eluent can be effected before the separating operation 1. For example, the eluent is heated in a heat exchanger.

An operation 4 for collecting at least one fraction of the product P is effected downstream of the column or extractor.

An operation 9 for regulating the pressure and an operation 10 for regulating the temperature of the eluent are preferably effected following the separating operation 1 and prior to the collecting operation 4.

The operation 9 for regulating the pressure consists, for example, of reducing pressure in the eluent enriched with at least one fraction of the product P, to a pressure that is less than the critical pressure of the supercritical fluid. If the supercritical fluid $CO_2$, the pressure reduction therefore occurs at a pressure that is less than 74 bars, and typically between 30 and 65 bars.

After the pressure reduction, the supercritical fluid is in liquid and gaseous form. The liquid part is in the majority, and depends on the pressure at which pressure reduction takes place.

This liquid part can be converted to a gas by heating during the operation 10 for regulating the temperature.

This conversion results in a drop in the density of the supercritical fluid and therefore in the solubility of the solute constituting the fraction of product P in this fluid. The solubility of the solute diluted in the modifier becomes almost zero, which allows separation of the solute, solid or liquid, of the supercritical fluid brought to the gaseous state, by means of gas-solid or gas-liquid separators.

An operation 5 for recycling the supercritical fluid brought to the gaseous state and mixed with a residual quantity of modifier follows on from the collecting operation 4 and precedes the first pumping operation 2.

There exist two causes for the presence of a residual quantity of modifier in the supercritical fluid brought to the gaseous state following the collecting operation 4.

Firstly, the modifier has a vapour tension that results in a certain solubility in the supercritical fluid brought to the gaseous state. The percentage of modifier that is recycled depends on the solubility of the modifier in the supercritical fluid brought to the gaseous state, and this solubility is a function of the pressure and temperature of the supercritical fluid brought to the gaseous state in the separators.

Secondly, the percentage of modifier that is recycled depends on the effectiveness of trapping in the separators.

The condensing operation 6 follows on from the collecting operation 4 and precedes the first pumping operation 2. It takes place advantageously during the recycling operation 5. The pressure and the temperature of the supercritical fluid mixture brought to the gaseous-modifier state, obtained by the corresponding regulating operations 9, 10, are constant during the collecting and recycling operations 4, 5 and up to the condensing operation 6, during which the temperature is lowered.

In addition, the method of the invention includes, downstream of the collecting operation 4 and upstream of the separating operation 1, an operation 7 for determining at least one magnitude associated with the modifier level mixed with the supercritical fluid recycled and brought to the gaseous or liquid state.

Preferably, in order to facilitate the implementation of the method, the operation 7 is effected upstream of the first pumping operation 2. The fact of measuring the density at the input to the pump facilitates the operation since, at this stage of the method, it is possible, whatever the operating conditions of flow, column type and size, temperature, etc., to maintain a constant pressure and temperature during execution of the method and from one method to the next.

If necessary, an operation 8 for correcting the flow in the first pumping operation 2 and the flow in the second pumping operation 3 is effected in order to limit the variations, during execution of the method, of the modifier level in the eluent at the input to the column or the extractor. The flows are corrected in a direction that is suitable for meeting a first setpoint, determined beforehand, of the total flow corresponding to the sum of the flows of the first pumping operation 2 and of the second pumping operation 3.

More particularly, FIG. 1 represents an advantageous version of the invention. According to this version, the operation 7 for determining at least one magnitude associated with the level of modifier mixed with the supercritical fluid brought to the liquid state takes place upstream of the first and second pumping operations 2, 3. It includes an operation, at one measuring point at least, for measuring the density of the supercritical fluid recycled and brought to the liquid state, mixed with a residual quantity of modifier, and an operation for evaluating the level of modifier mixed with the supercritical fluid, with the modifier level being evaluated, from the measured density, by means of a density=f (modifier level) calibration curve established beforehand at the pressure and the temperature existing at the measuring point and around the latter. Such a calibration curve is represented in FIG. 2.

The correction operation 8 consists, in this case, of modifying the flow in the first pumping operation 2, and the flow in the second pumping operation 3, in order to satisfy the first setpoint and a second setpoint, set beforehand, of modifier level in the eluent.

The density of the supercritical fluid, mixed with a residual quantity of modifier, is the sum of the densities of the constituents, namely the supercritical fluid and modifier, weighted by their percentage, with an offset in the case where the mixture of the constituents has a final volume other than the sum of the initial volumes of the constituents.

Figure 2:
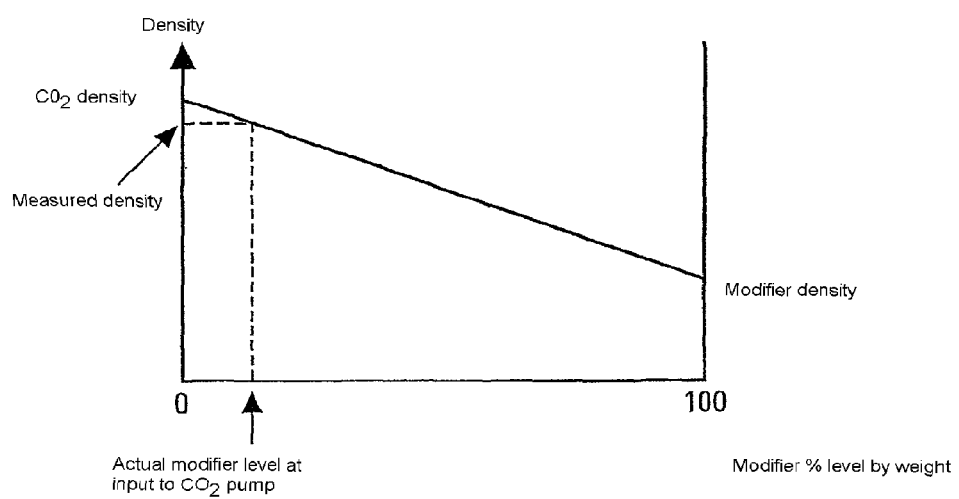
FIG. 2 represents a density=f (modifier level) calibration curve that can be used in accordance with the invention, and FIGS. 3 and 4 each represents a diagram of an installation according to the invention.

In FIG. 2, the term "density" refers to the mass per volume. Moreover, the $CO_2$ is given by way of an example of a supercritical fluid.

In order to draw a calibration curve as represented in FIG. 2, the density of the supercritical fluid mixed with a residual quantity of modifier, shown on the ordinate, is measured for different modifier levels, shown on the abscissa. The different supercritical fluid-modifier mixtures are created by the first and second pumping operations, at a given temperature and pressure.

The variation in the density of the supercritical fluid mixed with a residual quantity of modifier as a function of the modifier level depends on the difference in density of the pure constituents in the set conditions of pressure and temperature. The greater this difference, the greater too is the variation in the density of the mixture as a function of its composition, and the greater is the precision in determining the modifier level.

Therefore, it is preferable to establish conditions of temperature and pressure at which the difference in density of the pure constituents is greatest.

The precision in determining modifier level also depends on the precision of the test gear for measuring the density.

The density=f (modifier level) curve is linear, except in the case mentioned previously in which the supercritical-modifier fluid mixture has a final volume that is different from the sum of the initial volumes of supercritical fluid and modifier.

In the configuration of the invention represented in FIG. 1, the first pumping operation 2 and the second pumping operation 3 take place in parallel with each other.

Nevertheless, a configuration in which the second pumping operation takes place upstream of the first pumping operation also forms part of the invention.

It is preferable to measure the density in order to determine the level of modifier mixed with the supercritical fluid, in that this measurement is relatively easy to implement and has good precision, but other physical magnitudes can also be used to obtain the value of the level of modifier mixed with the supercritical fluid. It is possible, for example, to measure the thermal conductivity of the mixture, or indeed to perform a measurement of the absorption of this melange in the ultraviolet range.

According to another advantageous version of the invention, the operation for determining a magnitude associated with the level of modifier mixed with the supercritical fluid recycled and brought to the liquid state, consists of measuring the density of the mixture, which is then the eluent, upstream of the first pumping operation and downstream of the second pumping operation. In this case, the correction operation consists of modifying the flow in the first pumping operation and the flow in the second pumping operation in a direction that is suitable for meeting the first setpoint and a third setpoint, set beforehand, for the density of the eluent.

As before, it is possible to replace the measurement and the density setpoint of the eluent with a measurement and a setpoint of thermal conductivity or absorption in the ultraviolet.

In this configuration, one is not seeking to determine the residual modifier level in the supercritical fluid recycled and brought to the liquid or gaseous state, but to aim for a density setpoint at the input to the pump. For this, a regulation loop is created.

The density setpoint is determined, for example, by measuring the density corresponding to the modifier level in the eluent in the absence of recycling, by adjusting the flows of the pumping operations to as to ascertain the wanted modifier level and the total flow, in fixed operating conditions.

The regulation loop consists of adjusting the flows of the pumping operations in the direction that is suitable to satisfy two setpoints, namely density and total flow. A single pair of values of the flows in the first and second pumping operation satisfy both a density setpoint and to a total-flow setpoint.

Advantageously, the operation 7 for determining at least one magnitude associated with the level of modifier mixed with the supercritical fluid is effected downstream of the condensing operation 6. In fact, in order to measure the density, the supercritical fluid is preferably brought to the liquid state by cooling it to below the liquid-vapour equilibrium temperature, at the recycling pressure that is less than the critical pressure. Thus, the measurements are more precise than measurements in a gaseous phase.

Nevertheless, this operation for determining at least one magnitude associated with the level of modifier mixed with the recycled supercritical fluid can be performed upstream of the condensing operation 6. In this case, the density is measured in the supercritical fluid brought to the gaseous state.

One way of measuring the density is, for example, the use of a mass flowmeter based on the Coriolis principle, which can be used to obtain the flow and the density, or of an appliance dedicated to the specific measurement of the density of a fluid or of a mixture of fluids at a given pressure and temperature.

The measured density can be corrected to take account of the temperature.

The supercritical fluid is preferably carbon dioxide, but can be any fluid that is compatible with chromatography and/or extraction in the supercritical phase, such as an alkane, a chloro-fluoroalkane or xenon.

The modifier is preferably an alcohol, like methanol, ethanol or isopropanol for example, but can also be any organic solvent, such as acetonitrile, methyltertbutylether or MTBE, or ethyl acetate. It can be a mixture of at least two of these compounds.

Figure 3:
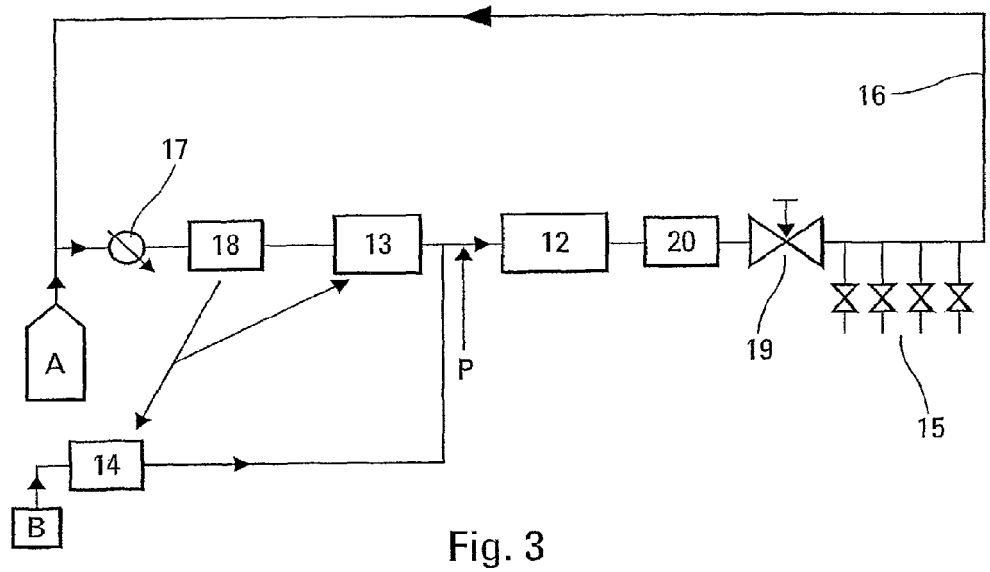
Figure 4:
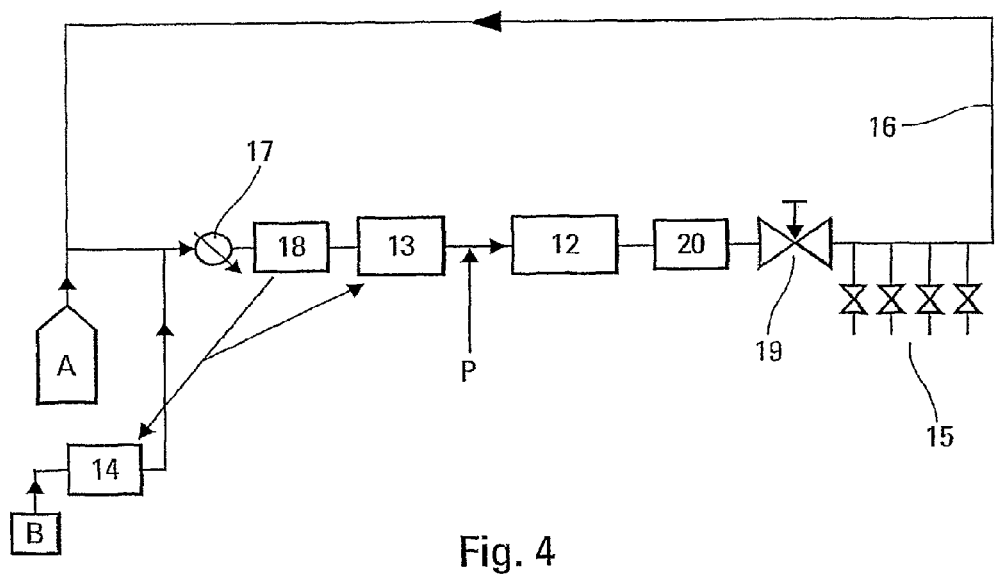

FIGS. 3 and 4 each schematically represent an installation according to the invention, which can be used to implement the method of the invention. We have chosen in particular to illustrate the chromatography installations.

The same elements making up the installation are each indicated by the same reference in these two figures.

FIG. 3 illustrates a first configuration according to the invention. This installation includes a separating device that includes at least one chromatography column 12.

This column 12 receives a mixture that includes a product P introduced by injection and an eluent that includes a supercritical fluid, such as the $CO_2$, and a modifier. The supercritical fluid, held in recipient A, is routed via a first pump 13 and the modifier, held in recipient B, is routed via at least one second pump 14.

At the output from the column 12, a detector 20 is used to detect the fraction or fractions of the product, (P) that come out of the column with the eluent.

These fractions are collected in a collection device 15 that includes at least one solid-gas or liquid-gas separator according to which the solute constituting the fraction of product (P) is solid or liquid. Several separators can be connected in series.

In the case of an eluent that is free of modifier and that is therefore a pure supercritical pure, its recycling would simply require arranging for the trapping of all the solute in the separator or separators.

In the case of the invention, the eluent includes modifier at between 0 and 100% by weight, preferably between 0.1% and 70%, or preferably between 0.5% and 35%. At the output from the column 12, there is a mixture of eluent and solute, making a mixture of three constituents—supercritical fluid, modifier and solute.

This mixture is put through a device to regulate the pressure, and a device to regulate the temperature. Thus, in a first stage, the mixture passes through a pressure-reducer 19 in order to reduce the pressure of the eluent. This results in a mixture of supercritical fluid brought to the liquid state, supercritical fluid brought to the gaseous state, modifier, and solute.

This last mixture is then heated in the device to regulate the temperature, in order to convert the supercritical fluid part brought to the liquid state into supercritical fluid brought to the gaseous state. One is therefore in the presence of two phases, namely a liquid phase containing the modifier in which the solute is soluble, and a gaseous phase of supercritical fluid brought to the gaseous state in which we find a certain modifier level and traces of solute.

A first separator is used to separate the liquid phase from the gaseous phase and to collect the soluble solute in the modifier.

The use of a second separator in series with the first allows all of the solute to be trapped.

A path 16 for recycling the supercritical fluid brought to the gaseous and then the liquid state mixed with a residual quantity of modifier is positioned between the collection device 15 and the first pump 13. The first pump 13 pumps at least the supercritical fluid brought to the liquid state and mixed with a residual quantity of modifier.

The pumped mixture first passes via a condenser 17 placed downstream of the collection device 15 and upstream of the first pump 13. The condenser 17 is preferably placed in the recycling path 17.

The installation according to the invention also includes a measuring and correcting device 18, placed in the recycling path 16 or downstream of the first pump 13 and upstream of the chromatography column 12. The measurements are facilitated in the case where the device 18 is located in the recycling path 16, upstream of the first pump 13.

This device 18 measures at least one magnitude associated with the level of modifier mixed with the recycled supercritical fluid and, if necessary, performs correction of the flow in the first pump 13 and of the flow in the second pump 14 in order to limit the variations, while running the installation, of this level at the input to the chromatography column 12.

The correction is effected in a direction that is suitable for meeting a first setpoint, determined beforehand, of total flow. The total flow corresponds to the sum of the flows in the first pump 13 and in the second pump 14. Preferably, the measuring and correcting device 18 is placed downstream of the condenser 17.

Nevertheless, the measuring and correcting device can also be placed upstream of the condenser.

In the first particular configuration represented in FIG. 3, the measuring and correcting device 18 is placed at a measuring point located upstream of the first and second pumps 13, 14, and more precisely the first pump 13 and the second pump 14 are mounted in parallel with each other.

According to a second particular configuration (not shown) of the invention, the second pump is positioned upstream of the first pump, and the measuring and correcting device is positioned at a measuring point located upstream of the second pump.

In this case, the installation has the advantage of requiring only a high-pressure pump, which is the first pump 13. The second pump 14, in series with and upstream of the first pump 13, can be just a low-pressure pump. For example, the first pump has a feed pressure of between 30 and 300 bars, preferably between 100 and 300 bars, and the second pump, for example, has a feed pressure of between 1 and 100 bars, preferably of the order of 50 bars.

At the measuring point, in these two configurations, the measuring and correcting device 18 measures a first magnitude associated with the modifier level mixed with the supercritical fluid recycled and brought to the liquid state, which is preferably the density of the mixture. From this measured density, the device 18 evaluates a second magnitude associated with the level of modifier mixed with the supercritical fluid recycled and brought to the liquid state, which is the modifier level, by means of a calibration curve such as that represented in FIG. 2.

The measuring and correcting device 18 modifies the flow in the first pump 13 and the flow in the second pump 14 in order to attain the first setpoint and a second setpoint, set beforehand, of modifier level in the supercritical-fluid/modifier mixture.

The setpoints are set by the user as a function of the process that he wishes to execute with the installation according to the invention.

The recycled supercritical fluid contains traces of modifier due to the solubility of the latter in the supercritical fluid brought to the gaseous state.

The first pump 13 pumps supercritical fluid brought to the liquid state and containing modifier, and the flow of supercritical fluid is less than its initial value, meaning than the value set at the start-up of the installation. It is therefore necessary to increase the flow in the first pump 13 in order to adjust the flow of supercritical fluid to its initial value by compensating for the presence of the modifier.

For example, at the start-up of the installation, the flow of supercritical fluid is set to a value of 80 g/min, and the flow of modifier to a value of 20 g/min. The first total-flow setpoint is therefore 100 g/min, and the user fixes the second setpoint of modifier level at 20%.

The residual level of modifier in the recycled supercritical fluid is 5% for example. In this case, if the flow is not corrected in the first pump 13, then the actual flow of supercritical fluid will be 95% of 80 g/min, which is 76 g/min.

It is then necessary to adjust the flow in the first pump 13 so as to satisfy the relation Q. x 0.95=80 g/min, where Q is the value of the corrected flow in the first pump 13. Here, Q is about 84.2 g/min. The flow in the first pump 13 is therefore increased by 4.2 g/min.

The flow in the second pump 14 is reduced so as to maintain a modifier level of 20% in the eluent, and a total flow of 100 g/min. The corrected flow in the second pump 14 is 100-84.2 or 15.8 g/min, which represents a reduction in the initial flow of 84.2×0.05 g/min which is about 4.2 g/min.

According to a third particular configuration of the invention, as represented in FIG. 4, the measuring and correcting device 18 measures the density of the eluent upstream of the first pump 13 and downstream of the second pump 14. In other words, this third configuration differs from the previous two in that the second pump 14 is installed upstream of the device 18.

In this third configuration, the correction consists of modifying the flow in the first pump and the flow in the second pump in a direction that is suitable for meeting the first setpoint and a third setpoint, set beforehand, for the density of the eluent.

This third setpoint can be determined by the user by calculation, given that the density of the supercritical-modifier fluid mixture is equal to the sum of the respective densities of the supercritical fluid and modifier, weighted by their respective percentages, but a more precise measurement is preferred, by measuring in the installation in operation without recycling.

For regulating the flows of the two pumps 13, 14, each of these pumps is connected to a flowmeter.

For example, an eluent is composed of $CO_2$, as the supercritical fluid, and ethanol as the modifier. For a pressure of 50 bars and a temperature of 0° C., the density of the $CO_2$ is 950 kg/m$^3$, and that of the ethanol is 789 kg/m$^3$. For precision in the measurement of the density of ±0.1 kg/m$^3$, it is possible to adjust the composition of the $CO_2$-ethanol eluent with a precision of ±0.05%.

The precision increases as the respective densities of the supercritical fluid and modifier differ from reach other. For example, in the case where the supercritical fluid is $CO_2$, the alcohols are very suitable as modifiers, in that they are of low density, and the chlorated solvents are also suitable in that they are high density.

Naturally however, the chromatography column 12 can be replaced by several chromatography columns or, in the case of one method of extraction, by an extractor in which we find the product P.

This column 12 can be one that contains a stationary phase like that used in chromatography in the gaseous phase, or a column containing a stationary phase like that used in chromatography in the liquid phase, such as high-performance liquid chromatography (HPLC), or indeed any other column compatible with the separation to be effected.

Likewise, the extractor used in the invention can have a liquid or solid stationary phase.

What is claimed is:

1. A separation method, including:
    performing a separating operation in a separation device, with the separation device receiving a product and feeding into an eluent that includes a supercritical fluid, routed via a first pumping operation, and a modifier, routed via at least one second pumping operation,
    collecting at least one fraction of the product downstream of the separation device,
    recycling the supercritical fluid mixed with a residual quantity of modifier, following after the collecting operation and preceding the first pumping operation, with the first pumping operation being used to pump at least the supercritical fluid mixed with a residual quantity of modifier, and
    performing a condensing operation following after the collecting operation and preceding the first pumping operation,
    the method being characterised in that it further includes:
    downstream of the collecting operation and upstream of the separating operation, determining at least one magnitude associated with the level of modifier mixed with the recycled supercritical fluid, and if necessary
    correcting the flow in the first pumping operation and the flow in the second pumping operation, in order to limit the variations, during execution of the method, of the modifier level in the eluent at the input to the separation device, in a direction that is suitable for meeting a first setpoint, determined beforehand, for the total flow.

2. The method according to claim 1, wherein determining at least one magnitude associated with the level of modifier mixed with the recycled supercritical fluid takes place upstream of the first and second pumping operations and includes:
    measuring, at one measuring point at least, the density of the recycled supercritical fluid mixed with a residual quantity of modifier, and
    evaluating the level of modifier mixed with the recycled supercritical fluid, with the modifier level being evaluated, from the measured density, by means of a density=f (modifier level) calibration curve, established beforehand at the pressure and the temperature existing at the measuring point and around the latter; and
    wherein the correcting operation consists of modifying the flow in the first pumping operation and the flow in the second pumping operation in order to meet the first setpoint and a second setpoint, set beforehand, of levels of modifier in the eluent.

3. The method according to claim 2, wherein the first pumping operation and the second pumping operation take place in parallel with each other.

4. The method according to claim 2, wherein the second pumping operation takes place upstream of the first pumping operation.

5. The method according to claim 1, wherein determining a magnitude associated with the modifier level in the eluent consists of measuring the density of the eluent upstream of the first pumping operation and downstream of the second pumping operation, and
    wherein the correcting operation consists of modifying the flow in the first pumping operation and the flow in the second pumping operation in a direction that is suitable to attain the first setpoint and a third setpoint, set beforehand, for the density of the eluent.

6. The method according to claim 1, wherein determining at least one magnitude associated with the level of modifier mixed with the recycled supercritical fluid is effected downstream of the condensing operation.

7. The method according to claim 1, wherein determining at least one magnitude associated with the level of modifier mixed with the recycled supercritical fluid is effected upstream of the condensing operation.

8. The method according to claim 1, wherein the supercritical fluid is carbon dioxide.

9. The method according to claim 1, wherein the modifier is an organic liquid solvent, like an alcohol for example.

10. The method according to claim 1, further including regulating the pressure followed by regulating the temperature, downstream of the separating operation and upstream of the collecting operation.

* * * * *